(12) United States Patent
Prucher

(10) Patent No.: US 7,117,598 B2
(45) Date of Patent: Oct. 10, 2006

(54) NET-SHAPED GEAR AND MANUFACTURING METHOD FOR FORMING NET-SHAPED GEAR EMPLOYING INSERT AND PREFORM

(75) Inventor: Stephen L. Prucher, Detroit, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 10/690,152

(22) Filed: Oct. 21, 2003

(65) Prior Publication Data

US 2005/0085331 A1    Apr. 21, 2005

(51) Int. Cl.
  B21D 53/28   (2006.01)
  B21K 1/30    (2006.01)
  B23P 15/14   (2006.01)
(52) U.S. Cl. ............. 29/893.2; 29/893.3; 29/893.34; 29/893.37; 29/521; 403/1
(58) Field of Classification Search ............. None
   See application file for complete search history.

(56) References Cited

U.S. PATENT DOCUMENTS

| | | | | |
|---|---|---|---|---|
| 2,331,909 A | * | 10/1943 | Hensel et al. ............... 428/553 |
| 3,100,333 A | | 8/1963 | Friend | |
| 3,200,665 A | * | 8/1965 | Wells .......................... 74/446 |
| 3,535,762 A | * | 10/1970 | Taylor ........................ 29/893.2 |
| 3,553,809 A | * | 1/1971 | Yamada et al. .......... 29/893.34 |
| 3,768,327 A | | 10/1973 | Dunn et al. | |
| 3,772,935 A | | 11/1973 | Dunn et al. | |
| 3,842,646 A | * | 10/1974 | Kuhn ........................ 72/354.8 |
| 3,921,669 A | | 11/1975 | Goff | |
| 3,962,772 A | * | 6/1976 | Haller ........................... 419/8 |
| 4,059,214 A | | 11/1977 | Weissmann | |
| 4,674,351 A | | 6/1987 | Byrd | |
| 4,791,269 A | | 12/1988 | McLean et al. | |
| 5,722,295 A | | 3/1998 | Sakai et al. | |
| 5,806,373 A | | 9/1998 | Parker | |
| 6,326,089 B1 | | 12/2001 | Claxton | |

FOREIGN PATENT DOCUMENTS

| | | | |
|---|---|---|---|
| GB | 1265137 | * | 3/1972 |
| JP | 07-051789 | * | 2/1995 |
| SU | 918605 | * | 4/1982 |

* cited by examiner

*Primary Examiner*—Eric Compton
(74) *Attorney, Agent, or Firm*—Harness, Dickey & Pierce, P.L.C.

(57) ABSTRACT

A differential assembly for a motor vehicle includes a plurality of pinion gears in meshing engagement with a plurality of side gears. At least one of the pinion gears and side gears is formed from a tubular insert and a tubular preform forged together in a forging die. A method for manufacturing a differential assembly is also provided.

10 Claims, 4 Drawing Sheets

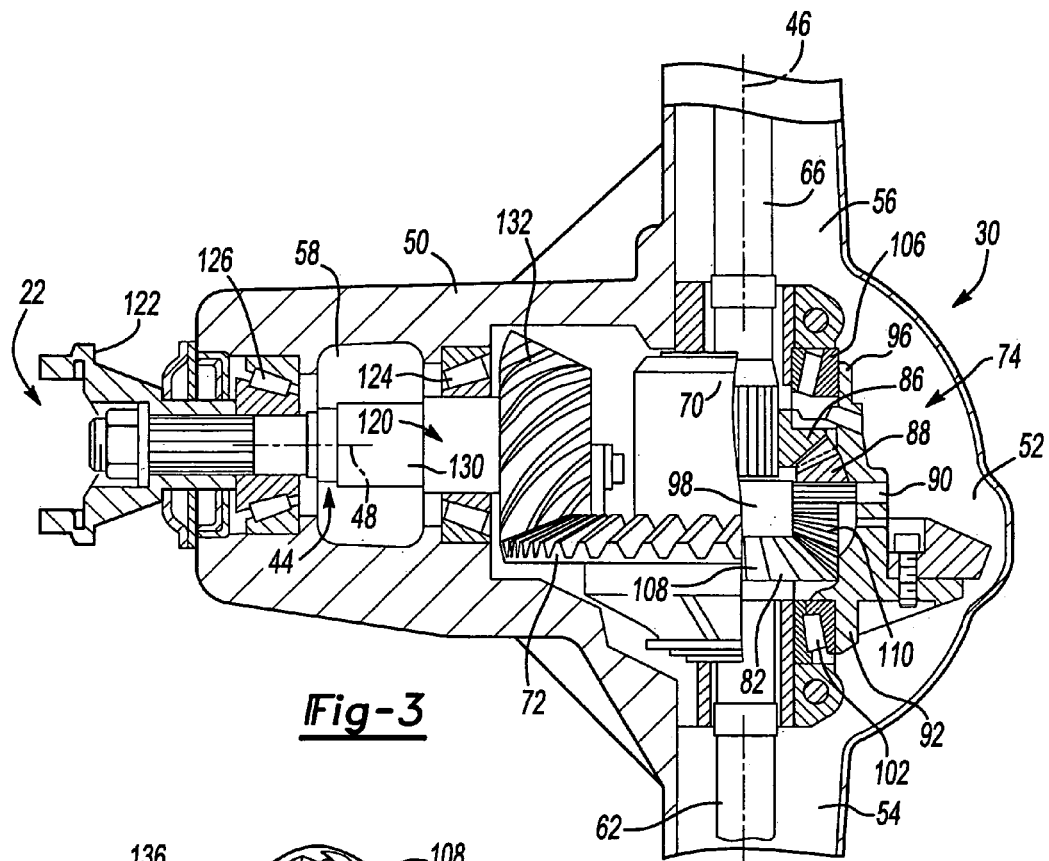
Fig-3
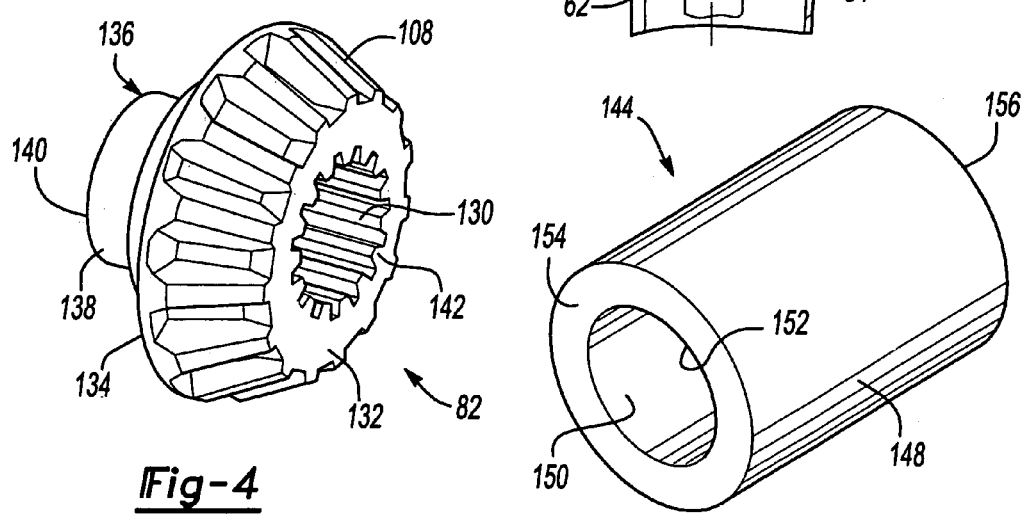
Fig-4
Fig-5

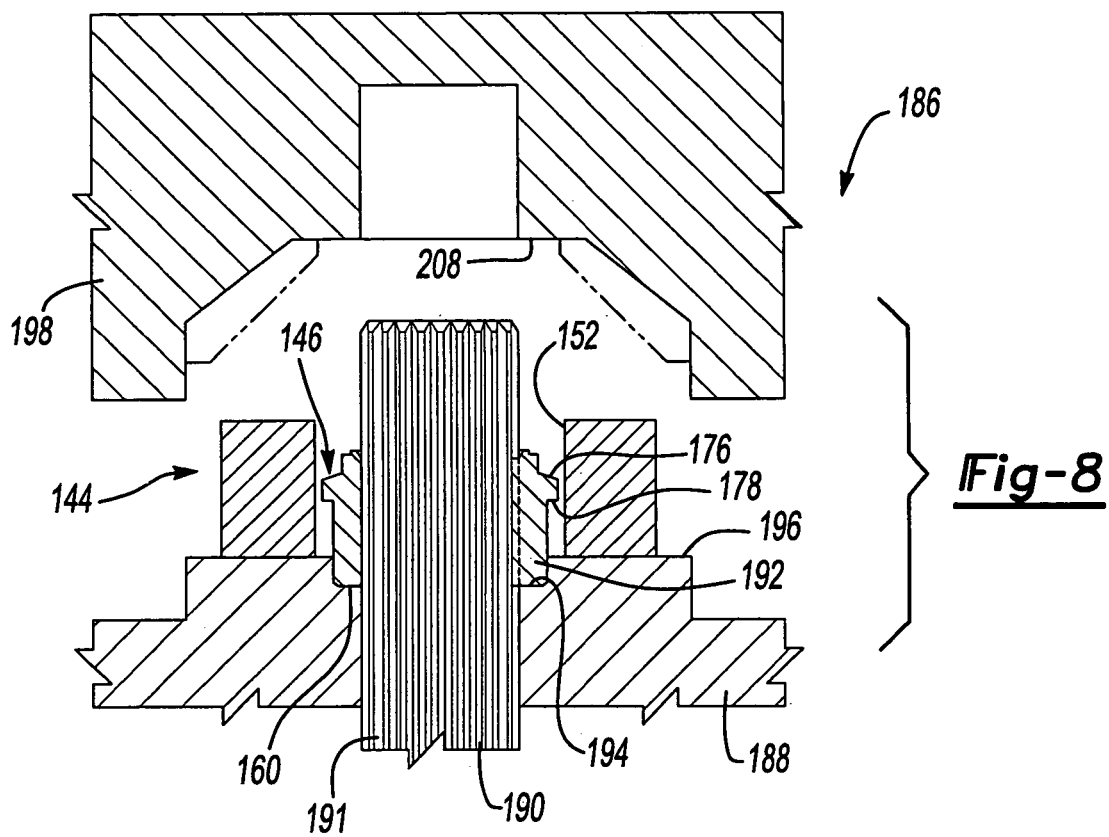
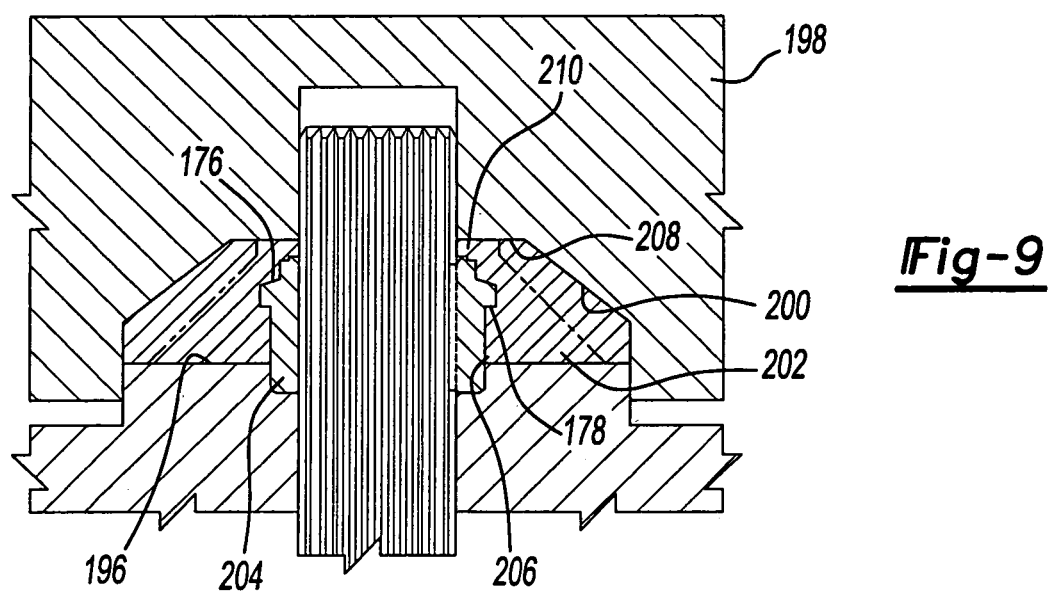

NET-SHAPED GEAR AND MANUFACTURING METHOD FOR FORMING NET-SHAPED GEAR EMPLOYING INSERT AND PREFORM

FIELD OF THE INVENTION

The present invention generally relates to a method for manufacturing gears and, more particularly, to differential side gears, pinion gears and hypoid gears adapted for use in vehicle differentials and a method for manufacturing the gears.

BACKGROUND OF THE INVENTION

As is well known in the art, the fabrication of typical differential side gears and pinion gears for an automotive differential assembly is complex and costly and as such, greatly adds to the cost of the differential assembly. A typical process for forming a differential gear includes forging, annealing, rough machining, carburizing, hardening and finish machining operations. Despite the almost universal use of such forming processes, several drawbacks have been noted.

One such drawback relates to the initial forming of the differential gear through forging. As those skilled in the art will appreciate, the differential gear is typically blanked or rough-formed in a forging operation from a solid billet of steel. This forging operation is relatively inefficient because the shape of the "in-process" forging is substantially different from the final desired gear shape. Specifically, each of the differential gears contemplated for manufacture by the present invention include relatively large apertures extending through the center of the gear. As such, many machining operations are required after forging. In addition, a relatively large proportion of the forging material is machined off and wasted.

Another drawback concerns the machining of the differential gear. The numerous machining operations that are performed on the differential gear typically account for more than 70% of the total cost of the gear. Furthermore, the protracted nature of the machining operations often results in an average cycle time that exceeds one or more days in length.

Yet another drawback concerns the material from which the differential gear is formed. Typically, the steel billet from which the gear is formed is a low carbon steel having characteristics that are particularly well suited to both forging and machining. Such steels, however, generally lack the strength that is desired for a gear and as such, a time consuming and costly carburization process is typically employed to create a layer of relatively high carbon steel on the surface of the differential gear. Carburization usually entails the placement of semi-finished gears into a heated, high-carbon environment for an extended period of time to permit carbon to migrate into the gear material to a predetermined depth. The differential gear is subsequently heat treated so that the high carbon layer provides a level of strength and durability that is commensurate with the intended application.

Accordingly, there remains a need in the art for an improved differential gear manufacturing method that permits increased flexibility in the design of the gears of the differential and the adaptation of lower cost processes for their manufacture.

SUMMARY OF THE INVENTION

In one form, the present invention provides a differential assembly for a motor vehicle. The differential assembly includes a plurality of pinion gears and side gears in meshing engagement with one another. At least one of the pinion gears and side gears is formed from a tubular insert and a tubular preform forged together in a die. A method for manufacturing a differential assembly is also provided.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIG. 3 is a section view of a portion of the rear axle illustrated in FIG. 2;

FIG. 4 is a perspective view of a differential side gear constructed in accordance with the teachings of the present invention;

FIG. 5 is a perspective view of a tube used for constructing preforms of the present invention;

FIG. 8 is a partial cross-sectional side view of a die for forming a gear from an insert and a preform, the die being in an open condition; and FIG. 9 is a partial cross-sectional side view of the die of FIG. 6 shown in a closed position.

DETAILED DESCRIPTION OF THE PREFERRED EMBODIMENTS

Figure 1:
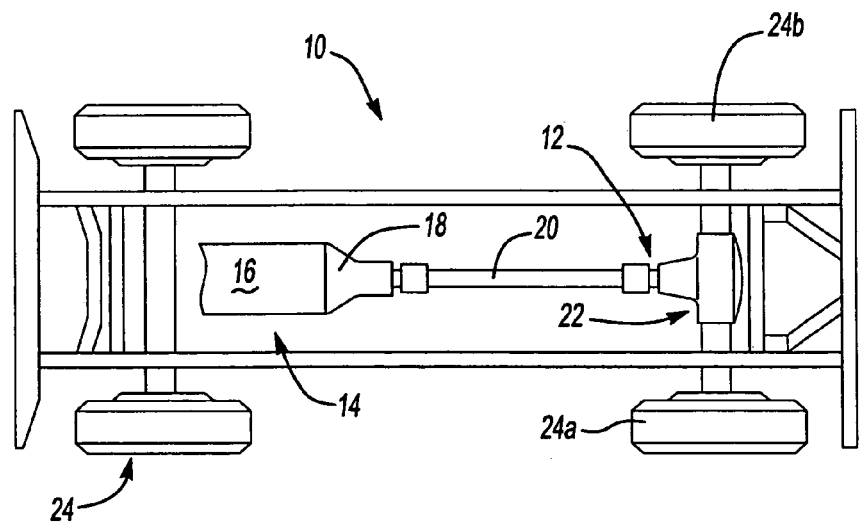
FIG. 1 is a schematic illustration of a motor vehicle constructed in accordance with the teachings of the present invention.

With reference to FIG. 1 of the drawings, a vehicle having a differential assembly constructed in accordance with the teachings of the present invention is generally indicated by reference numeral 10. The vehicle 10 includes a driveline 12 drivable via a connection to a power train 14. The power train 14 includes an engine 16 and a transmission 18. The driveline 12 includes a drive shaft 20, a rear axle 22 and a plurality of wheels 24. The engine 16 is mounted in an in-line or longitudinal orientation along the axis of the vehicle 10 and its output is selectively coupled via a conventional clutch to the input of the transmission 18 to transmit rotary power (i.e., drive torque) therebetween. The input of the transmission 18 is commonly aligned with the output of the engine 16 for rotation about a rotary axis. The transmission 18 also includes an output and a gear reduction unit. The gear reduction unit is operable for coupling the transmission, input to the transmission output at a predetermined gear speed ratio. The drive shaft 20 is coupled for rotation with the output of the transmission 18. Drive torque is transmitted through the drive shaft 20 to the rear axle 22 where it is selectively distributed in a predetermined manner to the left and right rear wheels 24a and 24b, respectively.

Figure 2:
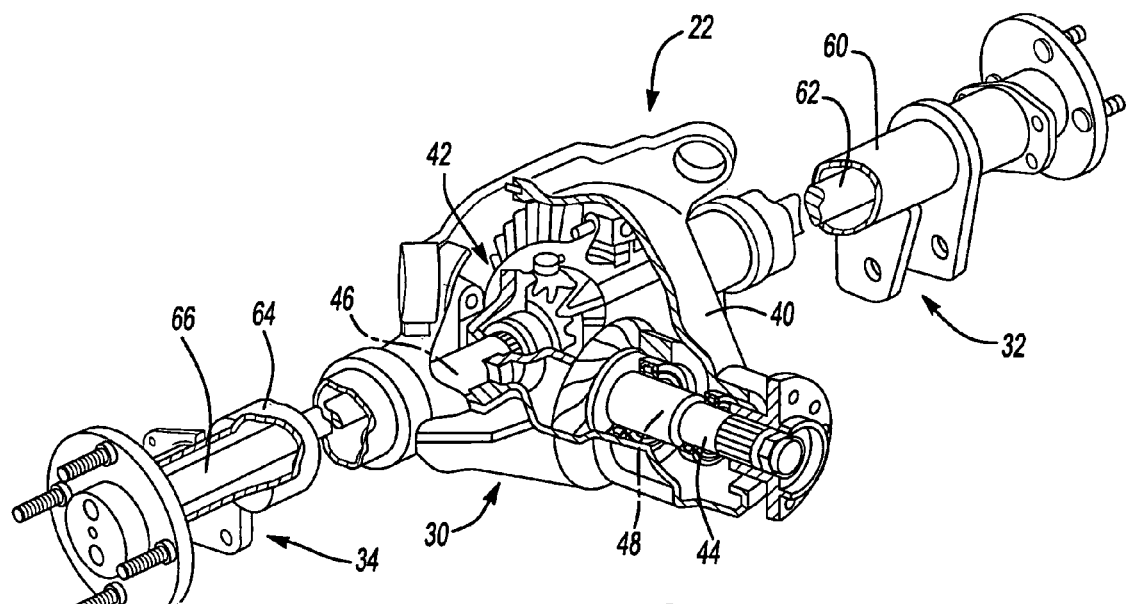
FIG. 2 is a fragmentary perspective view of a portion of the motor vehicle of FIG. 1, illustrating the rear axle in greater detail.
Figure 6:
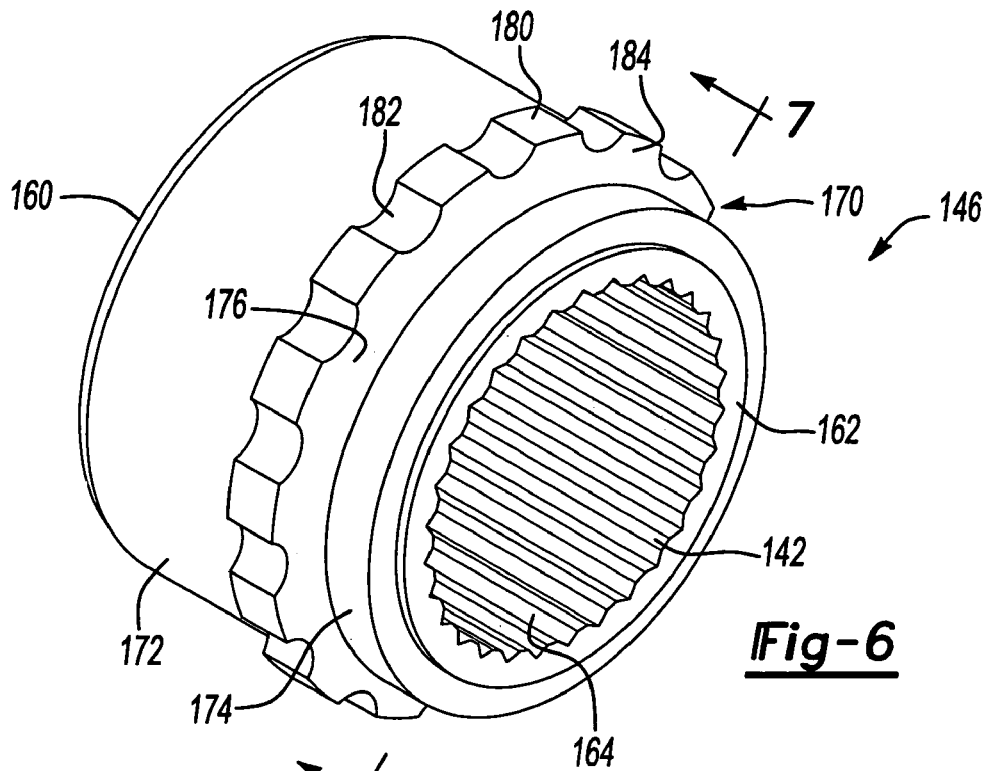
FIG. 6 is a perspective view of an exemplary tubular insert used for constructing gears of the present invention.
Figure 7:
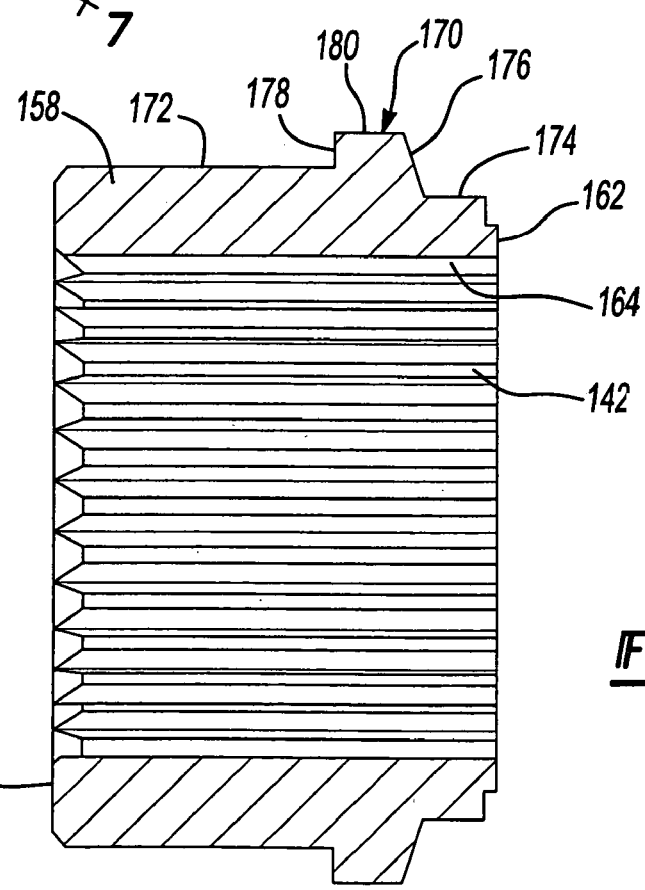
FIG. 7 is a cross-sectional side view of the tubular insert of FIG. 6.

FIGS. 2 and 3 depict the rear axle 22 to include a differential assembly 30, a left axle shaft assembly 32 and a right axle shaft assembly 34. The differential assembly 30 includes a housing 40, a differential unit 42 and an input shaft assembly 44. Housing 40 supports differential unit 42 for rotation about a first axis 46 and further supports input shaft assembly 44 for rotation about a second axis 48 that is perpendicular to first axis 46.

Housing 40 is initially formed in a suitable casting process and thereafter machined as required. Housing 40 includes a wall member 50 that defines a central cavity 52 having a left axle aperture 54, a right axle aperture 56, and an input shaft aperture 58.

Left axle shaft assembly 32 includes a first axle tube 60 fixed to left axle aperture 54 and a first axle half-shaft 62 that is supported for rotation in first axle tube 60 about first axis 46. Similarly, right axle shaft assembly 34 includes a second axle tube 64 that is fixed to right axle aperture 56 and which supports a second axle half-shaft 66 for rotation about first axis 46.

Differential unit 42 is disposed within central cavity 52 of housing 40 and includes a case 70, a ring gear 72 that is fixed for rotation with case 70, and a gearset 74 that is disposed within case 70. Gearset 74 includes first and second side gears 82 and 86 and a pair of differential pinions 88, which are rotatably supported on pinion shafts 90 that are mounted to case 70. Case 70 includes a pair of trunnions 92 and 96 and a gear cavity 98. A pair of bearing assemblies 102 and 106 are shown to support trunnions 92 and 96, respectively, for rotation about first axis 46. First axle half shaft 62 and second half shaft 66 extend through left and right axle apertures 54 and 56, respectively, where they are coupled for rotation about first axis 46 with first and second side gears 82 and 86, respectively. Case 70 is operable for supporting differential pinions 88 for rotation within gear cavity 98 about one or more axes that are perpendicular to first axis 46. First and second side gears 82 and 86 each include a plurality of teeth 108 which meshingly engage teeth 110 that are formed on differential pinions 88.

Input shaft assembly 44 extends through input shaft aperture 58 and includes an input pinion shaft 120, a conventional propeller shaft coupling flange 122 and a pair of conventional bearing assemblies 124 and 126. Each of bearing assemblies 124 and 126 includes an outer race that engages housing 40 in a press-fit manner. Bearing assemblies 124 and 126 cooperate with housing 40 to support the input pinion shaft 120 for rotation on second axis 48 in input shaft aperture 58.

As shown in FIG. 4, first side gear 82 includes a plurality of teeth 108 circumferentially surrounding an aperture 130. Teeth 108 extend from a front face 132 to a back face 134. A cylindrical sleeve 136 extends from back face 134. Cylindrical sleeve 136 includes an outer surface 138 and an end face 140. An internal spline 142 is formed within aperture 130 and extends through first side gear 82 from front face 132 to end face 140. Internal spline 142 is useful for drivingly interconnecting first side gear 82 and first axle half-shaft 62.

With reference to FIGS. 5–9, first side gear 82 and its method of manufacture will be described. However, it should be appreciated that many types of gears including second side gear 86, differential pinions 88 and the gear of input shaft 44 may be constructed incorporating the teachings of the present invention. For clarity, only first side gear 82 will be described in detail with the understanding that any one of the gears within differential unit 42 may be constructed as described hereinafter.

First side gear 82 includes is constructed from a preform 144 and an insert 146. Preform 144 is shaped as a section of substantially cylindrical tubing cut to length. Preform 144 includes an outer cylindrical surface 148 and an inner cylindrical surface 150 defining an aperture 152. Aperture 152 extends from a first end face 154 to a second end face 156.

Preform 144 may be constructed from a billet, welded tubing or seamless tubing. Welded tubing is manufacturing by rolling a substantially flat sheet in the shape of a cylinder. The edges of the flat sheet are joined to one another by a weld. The weld extends substantially to a longitudinal axis of the tube. Seamless tubing may be prepared by a variety of techniques including hot extrusion. Seamless tubing may be fabricated using low carbon steel or other alloys. In one embodiment, steel tubing having a sufficiently high carbon content to be hardened by an induction heat treat method is used.

Insert 146 is a substantially cylindrical member including a hollow body 158 having a first end face 160 and a second end face 162. An aperture 164 axially extends through hollow body 158 from first end face 160 to second end face 162. Internal spline 142 is formed within aperture 164 and extends substantially the entire length of the aperture. A flange 170 radially outwardly extends from hollow body 158. Flange 170 is axially positioned between first end face 160 and second end face 162 to define a first outer cylindrical surface 172 and a second outer cylindrical surface 174. First outer cylindrical surface 172 is positioned between flange 170 and first end face 160. Second outer cylindrical surface 174 is positioned between flange 170 and second end face 162. Insert 146 may be constructed from a powder metal material or a metal tube which has been swaged and/or rolled to produce the geometrical features previously described. A powder metal insert would most likely be sintered prior to insertion within the forging die of the present invention.

Flange 170 includes an upper annular surface 176 and a lower annular surface 178 interconnected by a third outer cylindrical surface 180. A plurality of recesses or scallops 182 are formed in third outer cylindrical surface 180. Scallops 182 are circumferentially spaced apart from one another such that the outer cylindrical surface 180 is interrupted about its entire circumference to form a plurality of protrusions 184. One skilled in the art will appreciate that the shape of scallops 182 shown in the figures is merely exemplary and that other interrupted geometrical forms such as gear teeth, axial splines or the like may be formed in flange 170 without departing from the scope of the present invention. Protrusions 184 are mechanically interconnected with preform 144 after the forging process has been completed. A radial interlock is formed between insert 146 and preform 144 as material from insert 146 enters scallops 182. The mechanical interconnection between insert 146 and preform 144 allows torsional energy to be transferred between the components without relative slipping between the preform and the insert.

FIGS. 8 and 9 depict a tool 186 used to forge first side gear 82. In the process, insert 146 is heated and placed on a lower die 188. A pin 190 extends through aperture 164 to properly position insert 146 on lower die 188. Pin 190 includes a shaped outer surface 191 which corresponds to the shape of aperture 164. In the embodiment shown, internal spline 142 is formed on the inner surface of aperture 164. The contours of pin 190 and aperture 164 are matched to minimize any deformation of insert 146 during forging.

Lower die 188 includes a pocket 192 for receipt of a portion of hollow body 158. First end face 160 is supported by a land 194 of pocket 192. Pocket 192 is sized such that lower annular surface 178 of insert 146 is spaced apart from a forging face 196 of lower die 188. As will be described in greater detail hereinafter, the gap formed between forging face 196 and lower annular surface 178 is filled with material from preform 144 during the forging process.

Preform 144 is also heated and placed on lower die 188. Preform 144 is positioned on lower die 188 such that at least a portion of insert 146 extends into aperture 152 of preform 144.

An upper die 198 is moveable from a first position shown in FIG. 8 to a second position shown in FIG. 9. The upper die position in FIG. 8 corresponds to an open die position. The position of the upper die 198 in FIG. 9 corresponds to a closed die position where upper die 198 and lower die 188 define a closed cavity 200 therebetween. During the closing movement of the upper die 198, preform 144 is contacted and deformed to fill cavity 200. Upon closure, side gear 82 is formed to include a first portion 202 corresponding to substantially deformed preform 144 and a second portion 204 including substantially undeformed insert 146. One of ordinary skill in the art will appreciate that the die configuration depicted is a closed or trapped die design. In a trapped die, all or substantially all of the material of preform 144 is restrained within cavity 200 during the forging process. On the contrary, an open-ended die design includes one or more pathways for superfluous material to exit the die cavity during the forging process. The trapped die design advantageously provides a gear having little to no flash thereby minimizing the need for subsequent machining operations. As those of ordinary skill in the art will appreciate from this disclosure, superfluous material can be directed to a desired area of the cavity 200, such as against the forging face 196 of the lower die 188 in the example provided, where it may be removed if necessary in a relatively low cost machining operation such as turning (e.g., facing) or milling.

Upper die 198 compresses preform 144 to form teeth 108 as a set of net-shaped teeth. Net-shaped teeth refers to the condition of teeth 108 as being completely formed and not requiring subsequent machine operations to properly form the geometry of the teeth. In this manner, the time and cost required to form a completed first side gear 82 is minimized. It should also be appreciated that the use of tubular preform 144 in conjunction with tool 186 substantially minimizes the quantity of scrap material generating during gear manufacture. As previously mentioned, standard rough gears exiting the forging process will require expensive and time-consuming processes such as boring and broaching to produce a splined aperture such as aperture 164 of insert 146. Material previously present in the gear aperture would be wasted.

During the forging process, axial and radial forces are of such a magnitude to cause material from preform 144 to envelop the geometrical features of insert 146. Specifically, material flows between forging face 196 and lower annular surface 178 of insert 146 to form a lower lip 206. Additionally, material flows between an end forging face 208 of upper die 198 and upper annular surface 176 of insert 146 to form an upper lip 210. Upon completion of the forging step, flange 170 is enveloped by preform 144. Because lower lip 206 engages lower annular surface 178 and upper lip 210 engages upper annular surface 176, insert 146 is axially restrained from movement relative to preform 144.

Depending on the mechanical interlock desired, an additional operation may be performed to couple insert 146 to first portion 202. Optionally, a brazing powder or solder is applied to the outer surfaces of insert 146 which are to be encapsulated by deformed preform 144. After the brazing powder or solder has been applied to insert 146, a heated preform 144 is positioned over insert 146 within lower die 188. The heated preform causes the brazing powder to melt. As such, an additional bond is created by brazing or soldering. During forging, preform 144 is substantially deformed during the closure of upper die 198 and lower die 188 to cause material from preform 144 to frictionally engage the brazing powder or solder as well as the outer surface of insert 146 to create a brazed or soldered joint therebetween.

It should be appreciated that only a portion of insert 146 is encapsulated within first portion 202 and that the amount of insert 146 extending from first portion 202 is determined by the die design. Accordingly, a variety of final gear designs are contemplated which include one or more portions of the insert protruding from the substantially deformed first portion. Furthermore, it is within the scope of the present invention to form the insert and/or preform using other materials or processes than previously described.

The foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A method of manufacturing a gear comprising:
   providing a die assembly having an upper die, a lower die and a mandrel, one of the upper die and the lower die defining a plurality of gear teeth, the upper and lower dies forming a closed die that defines a die cavity, the mandrel having a plurality of splines formed thereon, the mandrel being received into the die cavity;
   providing an insert portion formed of a solid substantially void-free metal, the insert portion having a hollow body and a flange, the hollow body having opposite axial end faces and an interior surface into which a plurality of mating splines are formed, the flange extending circumferentially about the hollow body between the opposite axial end faces of the hollow body;
   positioning the insert portion onto the mandrel such that at least a portion of the mating splines of the insert portion matingly engage the splines formed on the mandrel;
   positioning a preform portion within the die cavity such that the perform portion extends circumferentially about at least a portion of the insert portion, the perform portion being formed of a solid substantially void-free metal; and
   pressing the preform portion between the upper and lower dies in a pressing direction to form a gear in single stroke such that a plurality of gear teeth are formed on the preform portion, the perform portion deforming in at least one axial direction, a radially inward direction and a radially outward direction during the single stroke such that the preform portion is deformed about the opposite axial sides of the flange so that the flange is embedded into the preform portion and the perform portion is fixedly engaged to the insert portion.

2. The method of claim 1, wherein the perform portion is heated prior to pressing the preform portion between the upper and lower dies.

3. The method of claim 1, wherein a material is placed between the insert portion and the preform portion prior to the pressing the preform portion between the upper and lower dies, the material being configured to bond the insert portion to the preform portion.

4. The method of claim 3, wherein the material is selected from a group consisting of brazing materials and soldering materials.

5. The method of claim 1, wherein at least one locking feature is formed on the insert portion, the locking feature being formed such that the preform portion moves radially inward into the at least one locking feature when the preform portion is pressed between the upper and lower dies to thereby inhibit radial movement of the insert portion relative to the preform portion.

6. The method of claim 5, wherein the at least one locking feature is formed on the flange.

7. The method of claim 6, wherein the at least one locking feature includes a plurality of scallops.

8. The method of claim 1, wherein the flange includes a first axial side that is generally transverse to a longitudinal axis of the insert portion, and a second axial side that is opposite the first side, the second axial side tapering relative to the first axial side such that a radially outward side of the flange is thinner than a radially inward side of the flange.

9. The method of claim 1, wherein the flange includes a first annular surface, a second annular surface and an outer surface that is coupled to the first and second annular surfaces, and wherein at least one of the first and second annular surfaces is tapered so that a thickness of the flange decreases with increasing distance from the hollow body.

10. A method of manufacturing a gear comprising:

provxiding a die assembly having an upper die, a lower die and a mandrel, one of the upper die and the lower die defining a plurality of gear teeth, the upper and lower dies forming a die cavity, the mandrel having a plurality of splines formed thereon, the mandrel being received into the die cavity;

providing an insert portion formed of a solid substantially void-free metal, the insert portion having a hollow body and a flange, the hollow body having opposite axial end faces and an interior surface into which a plurality of mating splines are formed, the flange extending circumferentially about the hollow body between the opposite axial end faces of the hollow body, the flange includes a first annular surface, a second annular surface and an outer surface that is coupled to the first and second annular surfaces, and wherein at least one of the first and second annular surfaces is tapered so that a thickness of the flange decreases with increasing distance from the hollow body;

positioning a preform portion about the mandrel, the preform portion being formed of a solid substantially void-free metal;

positioning the insert portion onto the mandrel such that at least a portion of the mating splines of the insert portion matingly engage the splines formed on the mandrel; and pressing the preform portion between the upper and lower dies in a pressing direction to form a gear in single stroke such that a plurality of gear teeth are formed on the preform portion, the perform portion deforming in at least one axial direction, a radially inward direction and a radially outward direction during the single stroke such that the preform portion is deformed about the opposite axial sides of the flange so that the flange is embedded into the preform portion and the perform portion is fixedly engaged to the insert portion.

* * * * *